United States Patent [19]

Bachmann

[11] 3,839,732

[45] Oct. 1, 1974

[54] MAGNETIC TAPE HEAD INDEXING MEANS FOR MULTITRACT TAPE PLAYERS

[75] Inventor: Mario E. Bachmann, Northlake, Ill.

[73] Assignee: Motorola, Inc., Franklin Park, Ill.

[22] Filed: Feb. 26, 1973

[21] Appl. No.: 336,867

Related U.S. Application Data

[63] Continuation of Ser. No. 115,004, Feb. 12, 1971, abandoned.

[52] U.S. Cl. .................................................. 360/78

[51] Int. Cl. ........................ G11b 5/00, G11b 15/00

[58] Field of Search .......................... 274/4 A, 11 A; 179/100.2 CA

[56] References Cited

UNITED STATES PATENTS

| | | | |
|---|---|---|---|
| 3,386,294 | 6/1968 | Waldenburger | 274/4 A |
| 3,556,534 | 1/1971 | Bara | 274/4 A |
| 3,575,422 | 4/1971 | Peltz | 274/4 A |
| 3,628,796 | 12/1971 | Ban | 274/4 A |

FOREIGN PATENTS OR APPLICATIONS

| | | | |
|---|---|---|---|
| 1,795 | 1/1971 | Japan | 274/4 A |

*Primary Examiner*—Harry N. Haroian
*Attorney, Agent, or Firm*—James W. Gillman

[57] ABSTRACT

A magnetic tape head indexing cam device for a multitrack magnetic tape player to shift the tape head from one position to the next position by utilizing power from the capstan flywheel. An actuating lever has one end thereof selectively engageable with the tape head indexing cam device and is movable through a first distance by initiating means which couples the other end of the actuating lever to the capstan flywheel and thereafter the flywheel will move the actuating lever through a second distance to cause shifting of the tape head indexing cam device.

8 Claims, 6 Drawing Figures

INVENTOR.
MARIO E. BACHMANN
BY Mueller & Aichele
ATTORNEYS.

INVENTOR
MARIO E. BUCHMANN
BY Mueller & Aichele
ATTORNEYS.

INVENTOR.
MARIO E. BACHMANN
BY Mueller & Aichele
ATTORNEYS.

MAGNETIC TAPE HEAD INDEXING MEANS FOR MULTITRACT TAPE PLAYERS

This is a continuation, of application Ser. No. 115,004, filed Feb. 12, 1971, now abandoned.

BACKGROUND OF THE INVENTION

This invention relates generally to magnetic tape head indexing apparatus for multitrack magnetic tape players, and more particularly to a tape head indexing apparatus for use with cartridge type tape players.

Although the magnetic tape head indexing apparatus of this invention is illustrated herein in connection with a cartridge type tape player, it will be understood that the magnetic tape head indexing apparatus of this invention can be utilized with any type of tape player where such action is required.

Heretofore, shifting of a magnetic tape head from one position to a second position corresponding to the different track positions on a magnetic tape, required the use of a large and relatively expensive power solenoid to rotate a gear ratchet and cam surface about their common axis. The cam surface has different levels which are rotated into position by a pawl operatively engaging the gear ratchet and a slide member or cam follower on the tape head moves along the cam surface to shift the position of the tape head in response to the different levels on the cam. To rotate the cam surface and shift the levels from one position to another position, a signal is developed to cause energization of the solenoid and thus move the pawl past the gear ratchet to rotate the same through a limited arc movement. The amount of rotation of the cam surface depends on the number of different levels to which the tape head is to be positioned. Also, in one revolution of the cam surface the different levels may alternate between two or more positions as desired thus eliminating the need for relatively large degrees of rotation during each indexing operation. This actuation of the gear ratchet and pawl mechanism requires a relatively large and powerful electrical solenoid and, as such is relatively expensive. Furthermore, a large solenoid requires substantial space within or on the tape player for mounting, and will produce a substantial drain of power from an automobile battery, when such tape player is mounted in an automobile, as is commonly the case with cartridge type tape players.

SUMMARY OF THE INVENTION

It is an object of this invention to provide an improved multitrack magnetic tape player which is less expensive, and requires less power consumption from a battery of an automobile.

Antoher object of the invention is to provide an improved tape head indexing apparatus which is simple in construction, small in size and reliable in operation.

Briefly, a magnetic tape player of the type for receiving a quantity of multitrack magnetic tape is provided with a magnetic tape head having at least one magnetic pick-up area formed thereon. The magnetic pick-up area is initially arranged for engagement with one of the tracks on the magnetic tape and then shifted to a next position so that the pick-up area is in engagement with another track on the magnetic tape. The number of indexing positions is determined by the number of tracks formed on the multitrack magnetic tape. An actuating lever has one end engageable with the magnetic tape head to act as a pawl for operative engagement with a gear ratchet associated with the tape head indexing mechanism, and the other end of the actuating lever is connected to a stroke initiation mechanism. The stroke initiation mechanism may be a small, low-powered and inexpensive solenoid which moves the lever only a slight distance until it comes into engagement with the tape drive mechanism whereupon the tape drive mechanism moves the lever a substantial distance and with sufficient power to effect the shifting of the tape head.

DESCRIPTION OF THE PREFERRED EMBODIMENTS

Figure 1:
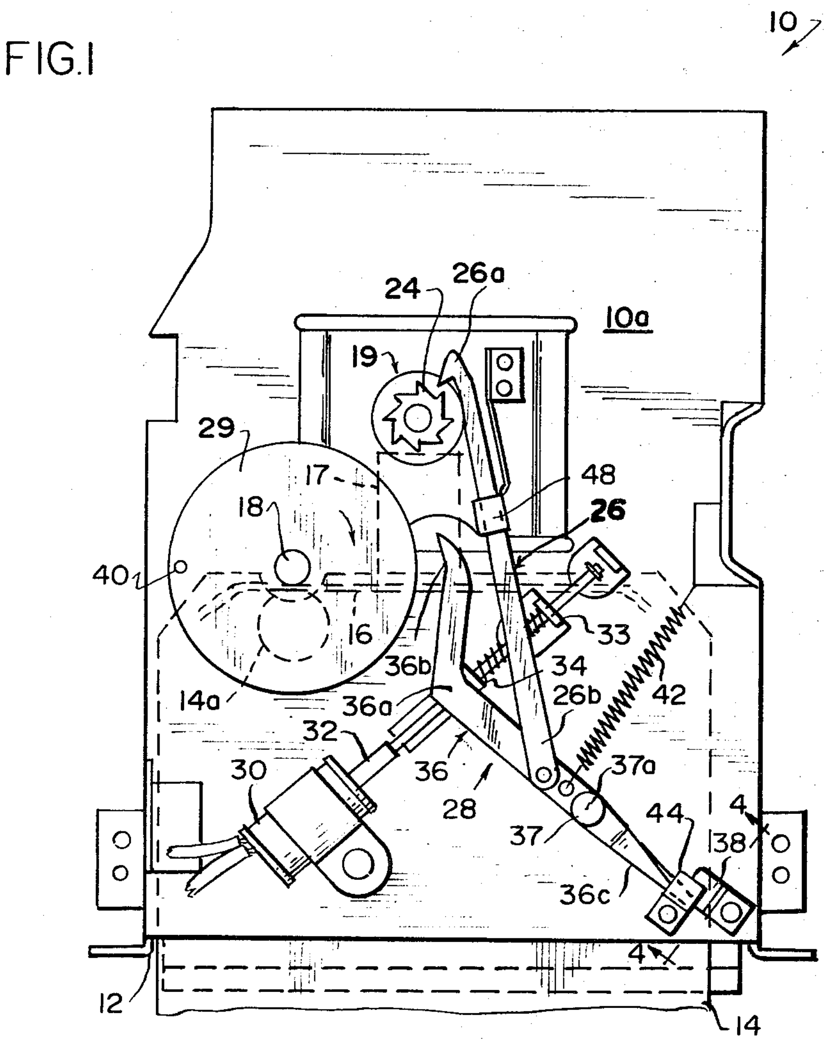
FIG. 1 is a plan view of a cartridge receiving housing which forms part of a magnetic tape player and illustrates one form of mechanism of this invention for indexing the magnetic tape head.
Figures 3, 6:
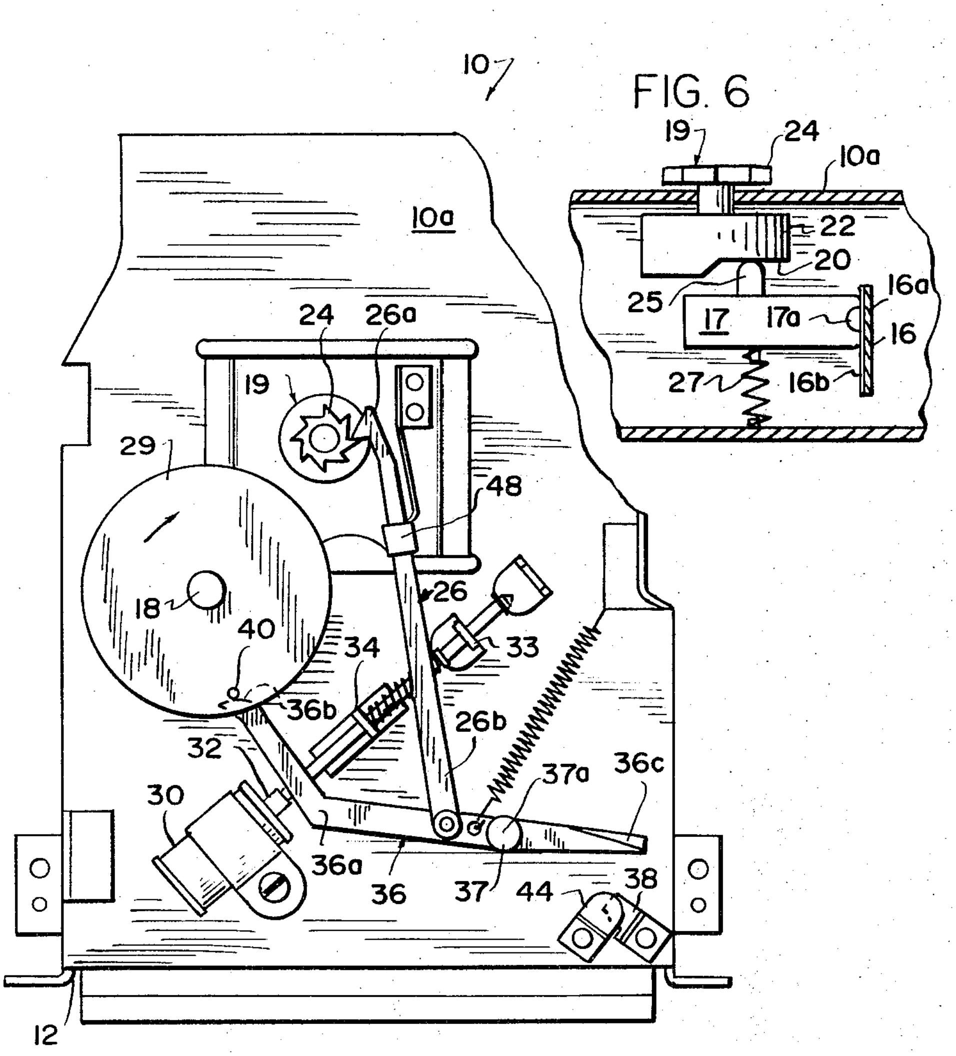
FIG. 3 is similar to FIGS. 1 and 2 and shows a complete power stroke being achieved to shift the position of the tape head indexing mechanism.
FIG. 6 is a diagrammatic illustration of a cam surface and gear ratchet for shifting the position of a magnetic tape head.

Seen in FIG. 1 is a portion of a cartridge receiving housing 10 of a cartridge type tape player which has an entryway 12 for receiving a cartridge 14 which contains a quantity of magnetic tape 16 therein. In this arrangement, the magnetic tape 16 is of the multitrack type having signal information on two or more linear tracks formed on the tape. A drive means, here illustrated as the capstan shaft 18 which can be driven by any suitable means such as an electric motor (not shown), is provided to engage the tape 16 and together with a pinch roller 14*a*, which is mounted within the cartridge 14, transports the tape past a magnetic tape head 17 whereupon the signal information on the track so engaging the tape is reproduced. As best seen in FIG. 6, the magnetic tape head 17 has the magnetic pick-up area 17*a* in alignment with a track 16*a* of the tape 16 during an initial operating condition. Magnetic head indexing means 19 is provided for shifting the magnetic tape head 17 from the initial position where the pcik-up area 17*a* engages the track 16*a* to a subsequent position where the pick-up area 17*a* engages a track 16*b*, which is here shown as being located below the track 16*a* in FIG. 6. The magnetic head indexing means 19 includes a cam surface 20 of an indexing cam 22 which is mounted for rotatable actuation by a gear ratchet 24 which extends through the top wall 10*a* of the cartridge receiving housing 10. Rotation of the gear ratchet 24 will rotate the cam surface 20 and correspondingly cause a cam follower 7 or slide member 25, formed on the magnetic tape head 17, to ride along the cam surface 20 and shift the position of the magnetic tape head. A spring 27 is provided to apply a force against the magnetic tape head 17 and urge the cam follower 25 against the cam surface 20.

An actuating lever 26 has a pawl end 26*a* positioned for engagement with the gear ratchet 24 to engage corresponding teeth thereof and rotate the indexing cam 22 one increment at a time about its axis. The other end 26*b* of the actuating lever 26 is fastened to stroke initiation means, here designated generally by reference numeral 28, which will move the actuating lever through a first distance to mechanically couple the stroke initiation means to a flywheel 29, or other drive means, which is rotated by the capstan shaft 18. Mechanical coupling is caused by the end 36*b* of an arm 36 coming into engagement with a pin 40 extending downward from the flywheel 29. This action will couple the other end 26*b* of the actuating lever 26, to the drive means, i.e., capstan shaft, to receive power therefrom and move the actuating lever through a second distance to effect a given stroke movement of the lever 26 and shift the position of the magnetic tape head by engaging the gear ratchet 24 with the pawl end 26*a*.

Figure 5:
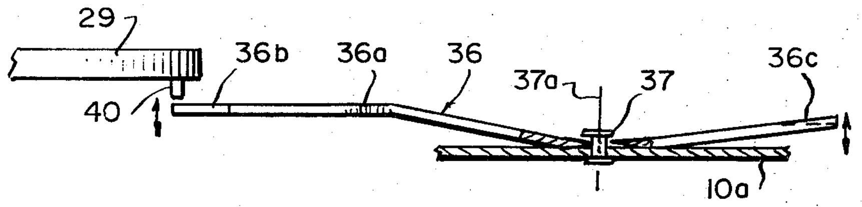
FIG. 5 is a side view of the actuating arm showing its relation to a flywheel of the tape drive means for receiving power therefrom.
Figure 2:
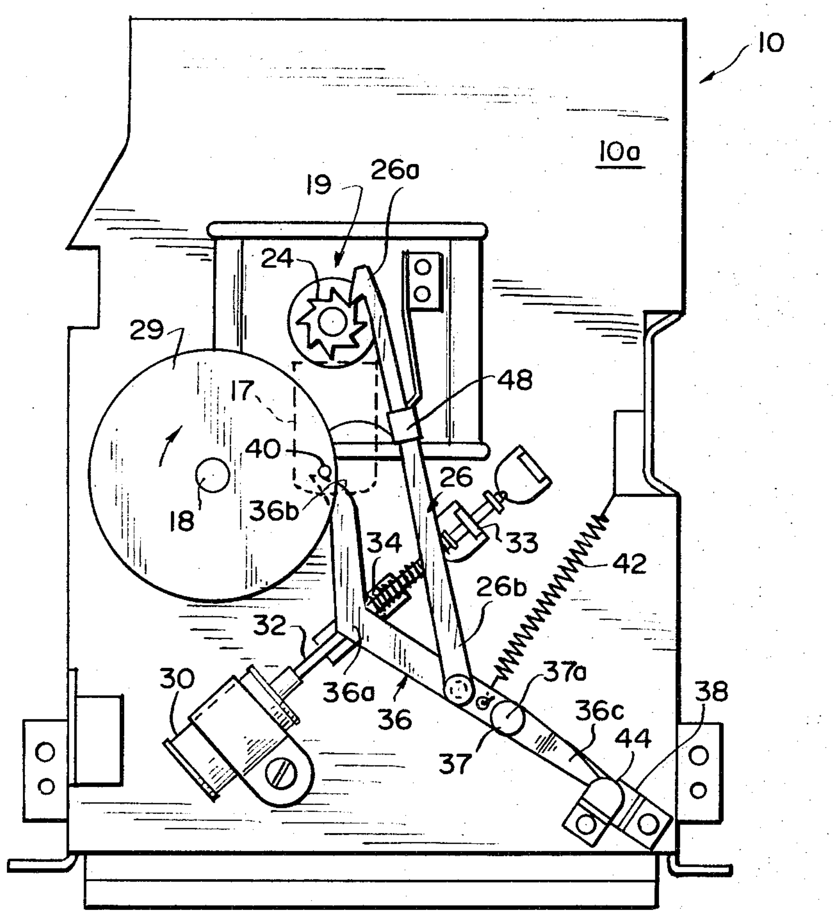
FIG. 2 is a plan view similar to FIG. 1 and shows initial engagement of the tape head indexing mechanism with the tape drive mechanism.

In the embodiment illustrated in FIGS. 1, 2 and 3, the stroke initiation means includes a solenoid 30, which is small in size and relatively inexpensive, as compared to the power solenoid previously used for actuation of the tape head indexing apparatus. The solenoid 30 has a plunger rod 32 which extends therefrom and passes through a guide member 33. The plunger rod 32 has a tab 34 which engages the back side or knee segment 36*a* of an actuating arm 36. The actuating arm 36 is pivotal about an axis 37*a* which may be the center of a rivet 37, or screw or the like, and forms a pivot point so that the arm can move in two directions. That is, the arm 36 moves rotatably about the pivot point or axis 37 as well as rocks up and down about the axis 37 as seen in FIG. 5.

Figure 4:
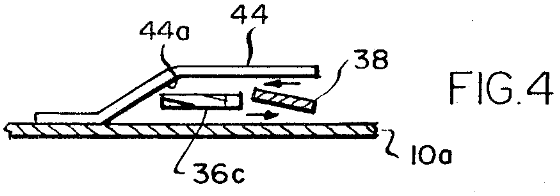
FIG. 4 is a partial suction through IV — IV, of FIG. 1 showing the end of the actuating arm and the relation of guide members for shifting the arm into proper position for operation.

The arm 36 is moved from its initial position, as shown in FIG. 1 to a power stroke initiating position as shown in FIG. 2. This is accomplished by energization of the solenoid 30 which moves the arm 36 a slight distance so that the rounded end 36*b* thereof is located under the flywheel 29. During this movement, the other end 36*c* of the arm 36 passes under a guide member 38 which may be a separate part secured to the housing or formed as an integral part of the housing 10. The guide member 38 causes the end 36*c* to be shifted downwardly, as best seen in FIGS. 4 and 5, which correspondingly raises the other end 36*b* to be in the circular path of the pin 40 as the flywheel 29 rotates. The flywheel 29 rotates in the direction of the arrow, as seen in FIGS. 1, 2 and 3, and the pin 40 engages the end 36*b* so that a force is applied to the arm 36 to rotate it about the axis 37*a*. This will cause the arm fully to disengage from under the guide member 38, as shown in FIG. 3 and effect a power stroke of the actuating lever 26 and move the pawl end 26*a* to rotate the gear ratchet 24 thereby shifting the position of the magnetic head 17. FIG. 3 illustrates the extreme position of the pin 40 that will carry the arm 36 to a point where the rounded end 36*b* ultimately disengages from the pin 40 completing the power stroke. The arm is then pulled back to its initial position by its return spring 42. This action will cause the end 36*c* of the arm 36 to move above the slanted guide member 38 and up the inclined slope thereof and correspondingly lower the end 36*b* so that it will go under and clear the pin 40 as it comes around a second time to prevent inadvertent subsequent actuation.

During the return actuation, the end 36*c* engages the bottom surface of a second guide member 44 which has declining slope 44*a* (FIG. 4) for directing the end 36*c* downward to ensure that it will travel under the guide member 38 at the next actuation. The actuating lever 26 has the end 26*b* pivotally connected to the arm 36 for movement through the given stroke movement so that the pawl end 26*a* will rotate the gear ratchet 24. This will cause the pick-up area 17*a* of the magnetic head 17 to shift from the track 16*a* on the tape to the track 16*b*, as seen in FIG. 6.

A guide retainer 48 is secured to the housing portion 10 in the region of the gear ratchet 24 to confine the movement of the actuating lever 26 so as to be substantially linear during its stroke. It will be understood that any suitable guide member may be utilized for this purpose. The solenoid 30 need only move the actuating lever 26 a short distance and thus is a relatively low power device which can be energized through a less expensive switch or switching arrangement which need not have the current rating previously required because of the larger more powerful solenoid.

What has been described is a simple and effective way of utilizing power from the tape drive mechanism of a tape player to effect a power stroke and shift the magnetic tape head from one position to another position.

I claim:

1. In a magnetic tape player having means for receiving and transporting a quantity of magnetic tape within an exchangeable cartridge which has at least two tracks of signal information formed on the tape, the combination including:

a capstan shaft positioned to frictionally engage the magnetic tape within the cartridge, drive means connected to said capstan shaft for rotating said capstan shaft for transporting the magnetic tape within the cartridge, a magnetic tape head having at least one magnetic pick-up area formed thereon, said magnetic pick-up area being initially indexed to one of the tracks on the magnetic tape, magnetic head indexing means for shifting the position of the magnetic head to move said magnetic pick-up area from one track on the magnetic tape to index the same to another track on the tape, a member connected to said capstan shaft for rotation therewith, a projection extending from said member, guide means mounted in the tape player, lever means movably mounted in the tape player, said lever means having a first arm portion, one end of which is engageable with said guide means to cause said first arm portion to be selectively engageable by said projection as it rotates with said capstan shaft in the actuated position, and a second arm portion coupled to said first arm portion and movable therewith for operating said magnetic head indexing means to shift the position of said magnetic tape head, resilient means mounted in the tape player and connected to said first arm portion of said lever means, and operating means responsive to the playing of one track of signal information on the tape, said operating means being coupled to said first arm portion of said lever means to move said lever means from said rest position to the operating position whereby said first arm portion moves into the path of rotation of said projection and is selectively engaged thereby, said movement of said first arm portion causing said second arm portion to operate said magnetic head indexing means to shift the position of the magnetic tape head, and said resilient means acting to return said first arm portion of said lever means from said operating position to said rest position.

2. The magnetic tape player of claim 1 wherein said operating means includes a solenoid which is operated with the playing of one track of signal information to move said lever means.

3. The magnetic tape player of claim 2 wherein said member connected to said capstan shaft is a circular member mounted to said capstan shaft which forms the axis of rotation for said circular member, and said projection extends from one side of said circular member and said first arm has the end thereof shaped to permit the same to disengage from said projection with said magnetic head being shifted.

4. The magnetic tape player of claim 3 wherein said tape head indexing means includes a cam having a plurality of cam surfaces for accurately indexing the magnetic head to the different tracks of signal information on the tape, a cam follower coupling the magnetic tape head to said cam and a ratchet coaxially mounted with said cam, and wherein said second arm of said lever means includes a pawl for engaging said ratchet to move said cam with said projection striking said first arm and moving the same.

5. The magnetic tape player of claim 3 wherein said circular member is a flywheel.

6. In a magnetic tape player having means for receiving and transporting a quantity of magnetic tape within an exchangeable cartridge which has at least two tracks of signal information formed on the tape, the combination including:

a capstan shaft, drive means connected to said capstan shaft for rotating said capstan shaft for transporting the magnetic tape within the cartridge, a magnetic tape head having at least one magnetic pick-up area formed thereon, said magnetic pick-up area being initially indexed to one of the tracks on the magnetic tape, magnetic head indexing means for shifting the position of the magnetic head to move said magnetic pick-up area from one track on the magnetic tape to index the same to another track on the tape, actuating means connected to said capstan shaft for rotation therewith, lever means mounted in the tape player for movement in first and second steps, said lever means having a first portion selectively engageable by said actuating means as it rotates with said capstan shaft when said lever means is moved from the rest position to the operating position, and a second portion coupled to said first portion for cooperating with said magnetic head indexing means to shift the position of said magnetic tape head, resilient means biasing said lever means from the operating position to the rest position out of the path of rotation of said actuating means, and operating means responsive to the playing of one track of signal information to move said lever means from said rest position in said first step whereby said first portion thereof moves into the path of rotation of said actuating means, said first portion thereby engaging said actuating means and moving therewith to move said lever means in said second step whereby said second portion thereof engages said magnetic head indexing means to shift the position of the magnetic tape head, with said resilient means acting to return said lever means from said operating position to said rest position.

7. The magnetic tape player of claim 6 wherein said actuating means includes a member mounted to rotate with said capstan shaft, said member having at least one projection protruding therefrom, said operating means includes a solenoid which is operated with the playing of one track of signal information to move said lever means in said first step which includes rocking the same so said first portion thereof moves into the path of rotation of said projection protruding from said rotating member thereby moving said lever means in said second step which includes rotating the same whereby said second portion thereof operates said magnetic head indexing means to shift the position of the magnetic tape head.

8. The magnetic tape player of claim 7 wherein said first and second portions of said lever means includes first and second arms, and said actuating means is a circular member mounted to said capstan shaft which forms the axis of rotation for said circular member, and said projection extends from one side of said circular member, and said first arm having the end thereof shaped to permit the same to disengage from said projection with said magnetic head being shifted.

* * * * *

Disclaimer 3,839,732.—*Mario E. Bachmann*, Northlake, Ill. MAGNETIC TAPE HEAD INDEXING MEANS FOR MULTITRACT TAPE PLAYERS. Patent dated Oct. 1, 1974. Disclaimer filed Dec. 8, 1976, by the assignee, *Motorola, Inc.*

Hereby enters this disclaimer to claims 1, 2, 3, 4, 5 and 6 of said patent.

[*Official Gazette February 1, 1977.*]